H. W. SUBERA.
PATTERN CHART.
No. 185,842. Patented Jan. 2, 1877.
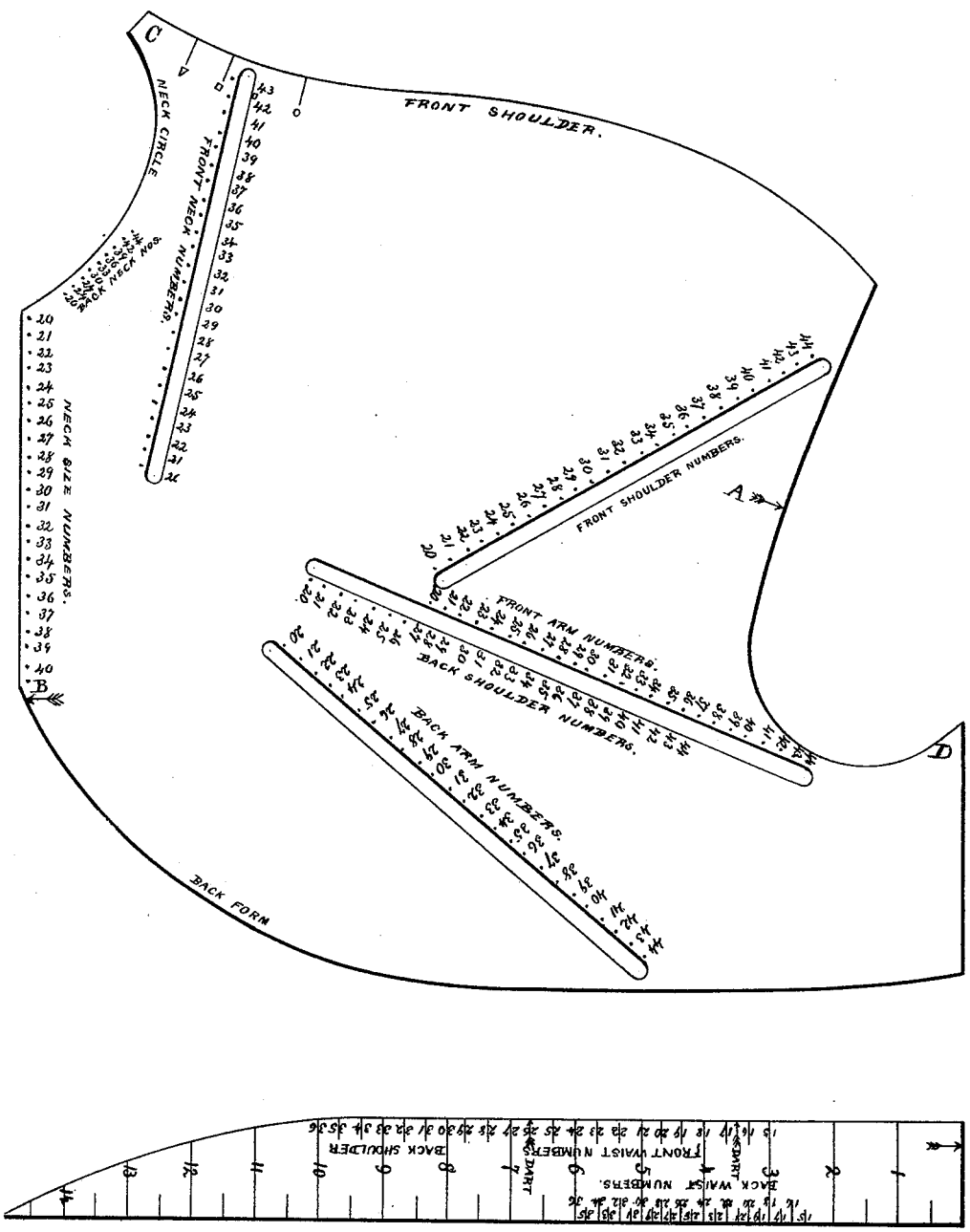

UNITED STATES PATENT OFFICE.

HARRY W. SUBERA, OF LYONS CITY, IOWA.

IMPROVEMENT IN PATTERN-CHARTS.

Specification forming part of Letters Patent No. 185,842, dated January 2, 1877; application filed July 8, 1876.

*To all whom it may concern:*

Be it known that I, HARRY WILSON SUBERA, of Lyons City, in the county of Clinton, and State of Iowa, have invented certain new and useful Improvements in Drafting Ladies' and Children's Garments; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to that system of cutting ladies' and children's garments known as the tailor or measure system, and consists of a chart made in the form, and provided with the lines, and figures, and marks, as shown by the accompanying drawing.

By this system only three measurements are required, all of which are usually taken at the same time. For the measure of the bust, I apply the tape over the breast, close under the arms, and over the shoulder-blades, drawing it quite tight, and note the measure-number—for example, say, 32. I then take the measure around the waist, and note the measure-number, say, 24. The length of the waist is then taken by applying the tape from the arm-pit to the top of the hip, noting the measure-number, say, eight inches. The plat of the garment is then made as follows: A hem-line is drawn on the cloth the width of the rule from the edge of the cloth, and the edge of the chart, marked "neck size numbers," is placed parallel with and on the said hem-line, and dots or marks are made on the line of the "front neck numbers," on the line of the "front shoulders numbers," and on the line of the "front arm numbers," opposite the measure-number of the bust—viz., in the example given, 32—and, for convenient reference in platting the garment, these marks are designated, respectively, as 32′, 32″, and 32‴. Then place the point of the chart marked C at the dot 32′ on the front neck numbers, and trace a line to dot 32″ on front shoulder numbers, by the curve of the chart marked "front shoulder." Then drop the chart three-quarters of an inch, and draw another line for a seam. Then place the lower part of the point C on the seam-line, directly under dot 32′, and bring number 32 on line marked "neck-size number" to intersect the hem-line, and trace the neck-circle by the chart from point C to the hem-line. Then place the point of the arrow A at dot 32‴ on front arm numbers, and adjust the chart so that the line extending upward from the arrow intersects dot 32″ on line of front shoulder numbers, and by the chart draw the curve of the arm size to the point D.

For the top of the darts, place the straight edge of the rule at right angles to the hem-line and tangent to the curve of the arm size, and then drop the square end of the rule a space equal to its width on the hem-line, and mark at the dart arrows, which marks, for convenience, are here designated, respectively, F and G. From the point D on the chart measure downward parallel with the the hem-line one inch longer than the length of the waist, for the increased length caused by the seam coming above the arm-pit, where the measure was taken from—which, in the example given, will be nine inches—and indicate the measurement by a mark, E. Then place the rule, straight-edge up, at right angles from hem-line to point E, drop the end of rule on hem-line one inch, and trace a straight line through point E, forming the waist-line. On the waist-line, one and a half inch from hem-line, make a dot, H, and place the point of the rule at dart, dot F, and trace the curve by the curved edge of the rule to the dot H, and also by the straight edge of the rule draw a straight line from point F to the waist-line, for basque. Then turn the rule, and, placing its straight edge to the straight line above-named, trace by the curved edge the balance of the dart. Allow half an inch space, and mark the second dart in the same manner, from the dart-point G. Then place the rule with the square end back of the second dart, and mark the waist-measure, 24, on the waist-line—found on the rule-edge marked front waist numbers—which mark may be designated by J. Then place No. 14, near the point of the rule, at point D of chart, and place the edge of the rule at point J, and trace the curved line, move out the rule one inch, and trace another line for a seam.

For the back of the garment, draw a line three quarters of an inch up for a seam-line, and place the edge of the chart against this seam-line the same as for the front, and on the back neck numbers mark the nearest number to the bust-measure, which in the example given is 33, and also dot at No. 32 on the back shoulder numbers, and at 32 on the back arm numbers, which points may be marked, respectively, K L M. Then place the point at No. 12 on the curve edge of the rule at point L, and draw a line to K by the curve edge of the rule, and add three-quarters of an inch for a seam.

For the back of the neck, place the rule with the point at K, with the straight edge at right angles to the seam-line, and trace the curve.

For the back of the arm size, place the point of the rule at L, and by the curve edge of the rule trace a line to point M. For the length of the waist under the arm, place the arrow on the square end of the rule at the point M, and on a line extended from L to M, measure downward nine inches, and make a dot, N, and measure one inch from M and N for seam. Place the rule at right angles to the seam-line, and by the straight edge of the rule draw a line through dot N to the waist-measure number 24, on the back waist numbers. Place number 14 near the point of the rule, at point M, with the curved edge of the rule toward the seam-line, and trace a line by the curved edge of the rule to point N, and another line parallel with the last-named line through the points, one inch from M and N for a seam.

For the back form, bisect the line between the points L and M, and mark the point off by section O. And on the waist line make a dot, P, one inch from the seam-line. Then, from point O to point P, trace a line by the curved edge of the chart, marked "back form." In tracing this line the point of arrow B is usually placed at O; but it may be varied up or down to the right or left, to suit the form of the person.

Other garments than those for ladies or children may be cut in like manner by changing the figures to suit the size, form, and styles.

I claim—

The chart, constructed as described, and provided with the lines, curves, and scales, substantially as and for the purposes set forth.

In testimony that I claim the foregoing as my own invention, I affix my signature in presence of two witnesses.

HARRY WILSON SUBERA.

Witnesses:
   WILLIAM W. SANBORN,
   J. MUNROE.